(12) United States Patent
Bhaskaran et al.

(10) Patent No.: US 11,500,075 B2
(45) Date of Patent: Nov. 15, 2022

(54) IDENTIFYING AND/OR REMOVING GHOST DETECTIONS FROM LIDAR SENSOR OUTPUT

(71) Applicant: Zoox, Inc., Foster City, CA (US)

(72) Inventors: Sreevatsan Bhaskaran, San Jose, CA (US); Mehran Ferdowsi, San Mateo, CA (US); Ryan McMichael, Mountain View, CA (US); Subasingha Shaminda Subasingha, Weston, FL (US)

(73) Assignee: Zoox, Inc., Foster City, CA (US)

(*) Notice: Subject to any disclaimer, the term of this patent is extended or adjusted under 35 U.S.C. 154(b) by 946 days.

(21) Appl. No.: 16/276,327

(22) Filed: Feb. 14, 2019

(65) Prior Publication Data

US 2020/0249326 A1    Aug. 6, 2020

Related U.S. Application Data

(60) Provisional application No. 62/800,386, filed on Feb. 1, 2019.

(51) Int. Cl.
  *G01S 7/4863* (2020.01)
  *G01S 7/487* (2006.01)
  *H04B 10/50* (2013.01)

(52) U.S. Cl.
  CPC .......... *G01S 7/4863* (2013.01); *G01S 7/4873* (2013.01); *H04B 10/503* (2013.01)

(58) Field of Classification Search
  CPC .... G01S 7/4863; G01S 7/4873; G01S 7/4815; G01S 17/931; H04B 10/503
  See application file for complete search history.

(56) References Cited

U.S. PATENT DOCUMENTS

| | | | |
|---|---|---|---|
| 9,383,753 | B1 | 7/2016 | Templeton et al. |
| 9,530,062 | B2 | 12/2016 | Nguyen et al. |
| 2007/0219720 | A1 | 9/2007 | Trepagnier et al. |
| 2015/0266472 | A1 | 9/2015 | Ferguson et al. |
| 2016/0274589 | A1 | 9/2016 | Templeton et al. |
| 2016/0291134 | A1 | 10/2016 | Droz et al. |
| 2019/0339393 | A1* | 11/2019 | Lingg .................. G01S 17/931 |

OTHER PUBLICATIONS

PCT Search Report and Written Opinion dated Apr. 30, 2020 for PCT Application No. PCT/US2020/016291, 8 pages.
Royo et al, "An Overview of Lidar Imaging Systems for Autonomous Vehicles", Applied Science, No. 9, 2019, 37 pages.
PCT International Preliminary Report on Patentability dated Aug. 12, 2021, from PCT/US2020/016291.

* cited by examiner

*Primary Examiner* — Luke D Ratcliffe
*Assistant Examiner* — Sanjida Naser
(74) *Attorney, Agent, or Firm* — Lee & Hayes, P.C.

(57) ABSTRACT

A LIDAR system that identifies, from a channel output, a false positive return and/or suppressing a corresponding false positive detection caused, in some cases, a strong reflection by a highly reflective surface that caused light to leak from a first channel to a second channel. The LIDAR system described herein may identify, as a false return, a return detected in the second channel that has an intensity that is much less than a return in the first channel and indicates a distance that is the same or very close to a distance indicated the return in the first channel. Based at least in part on identifying a return as a false return, the LIDAR system may suppress a false detection associated with the false return by modifying a detection threshold.

20 Claims, 7 Drawing Sheets

IDENTIFYING AND/OR REMOVING GHOST DETECTIONS FROM LIDAR SENSOR OUTPUT

RELATED APPLICATION

This application claims the benefit of U.S. Provisional Application No. 62/800,386, filed Feb. 1, 2019, the entirety of which is incorporated by reference.

BACKGROUND

Light detection and ranging or "LIDAR" refers to a technique for measuring distances to visible surfaces by emitting light and measuring properties of the reflections of the light. A LIDAR system has a light emitter and a light sensor. The light emitter may comprise a laser that directs light into an environment. When the emitted light is incident on a surface, a portion of the light is reflected and received by the light sensor, which converts light intensity to a corresponding electrical signal.

A LIDAR system has signal processing components that analyze reflected light signals to determine the distances to surfaces from which the emitted laser light has been reflected. For example, the system may measure the propagation time of a light signal as it travels from the laser emitter, to the surface, and back to the light sensor. A distance is then calculated based on the flight time and the known speed of light.

Some LIDAR system comprise multiple channels—multiple pairs of emitters and corresponding sensors separated by an azimuth of three to five degrees. According to the design of some multi-channel LIDAR systems, two or more light emitters of a LIDAR device may fire simultaneously and any returns may be read by sensors of the corresponding channels simultaneously. This may increase the point cloud density generated by the LIDAR system within a given amount of time.

However, highly reflective objects, such as retroreflectors which are commonly integrated into traffic signs, license plates, etc., may reflect much of the emitted light. This strong reflection may cause cross-channel noise (such as optical leakage) between nearby channels (e.g., wherein at least the sensors are located next to each other physically and/or the sensors are within a threshold physical distance of each other) that are simultaneously activated. For example, a first emitter and a second emitter of two adjacent channels may fire light pulses into an environment at slightly different angles. If light emitted by the first emitter hits a retroreflector, a first sensor associated with the first emitter may generate an intense output signal and the reflection may be strong enough that some of the light may leak into the adjacent second channel and be detected by a second sensor associated with the second emitter.

Because that adjacent channel is active, the sensor for the second channel may indicate a false detection—a weak signal indicating that an object exists at a location where no object actually exists. Because of the azimuth of separation between the first channel and the second channel, this false detection typically appears to the left or to the right of the true positive detection by three to five degrees.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

The techniques discussed herein may comprise identifying a false return and/or removing (and/or otherwise ignoring, suppressing, and/or discarding) a false detection generated based at least in part on a light sensor's output signal. As used herein a false detection is a false positive indication that a surface exists in an environment surveyed by a LIDAR device. In some examples, the false detection may be associated with a false return, which may be a false positive indication that a portion of an output signal of a sensor is associated with a "return," a signal generated responsive to a reflection of light emitted by an emitter of a same channel as the sensor.

The techniques discussed herein regard a first output signal generated by a first sensor associated with a first channel and a second output signal generated by a second sensor associated with a second channel. The techniques may comprise determining that two channels were active contemporaneously (e.g., at least the light sensors of the two channels were "on", e.g., generating an output signal indicative of light incident on the light sensor substantially contemporaneously and/or for an overlapping amount of time), determining that the first output signal indicates a depth measurement that is within a threshold distance of a depth measurement indicated by the second output signal (e.g., the depth measurement may be determined based on a time delay of arrival indicated by a "return" identified by the output signal), a threshold time between returns, that the return having a lower maximum intensity doesn't meet or exceed a threshold, and/or determining that a difference in intensity (or a relative intensity) between the first output signal and the second output signal meets or exceeds a threshold (e.g., determining a difference in intensity between a first return associated with the first output signal and a second return associated with the second output signal). In other words, identifying a false detection may comprise determining that output signals generated by two active channels include returns that indicate a similar depth measurement (within a threshold) and/or that have vastly disparate intensities (e.g., the signal of a first channel includes a very intense return, whereas the signal of a second channel includes a weak return).

Once the LIDAR system identifies a false return, the techniques may include suppressing the false return from being identified as a detection. This suppression may be accomplished by preventing the LIDAR system from positively identifying the detection as a true positive detection. Preventing the LIDAR system from identifying the detection as a genuine detection may include increasing a detection threshold by a static amount, increasing the detection threshold detection by an amount determined based at least in part on the output signal of the first channel and/or the second channel, increasing the detection threshold for the portion of the output signal corresponding to the detection, increasing the detection threshold for one or both channels, and/or discarding the output signal. For example, the LIDAR system may be configured to output, as a positive detection, a distance measurement and/or angle associated with portion(s) of an output signal that meet or exceed the detection threshold. In some examples, the LIDAR system may preliminarily identify, as a return, any portion of an output signal that meets or exceeds the detection threshold.

Although the discussion herein primarily discusses two channels, it is understood that the techniques may be applied to two or more channels and that the discussion of two channels in no way limits application of the techniques only to two channel systems.

The techniques discussed herein may improve the accuracy of LIDAR detections by reducing the number of false positives generated by a LIDAR device. The techniques discussed herein may accordingly improve the safety and accuracy of operation of systems that rely on detections generated by a LIDAR device.

Example Lidar System

Figure 1A:
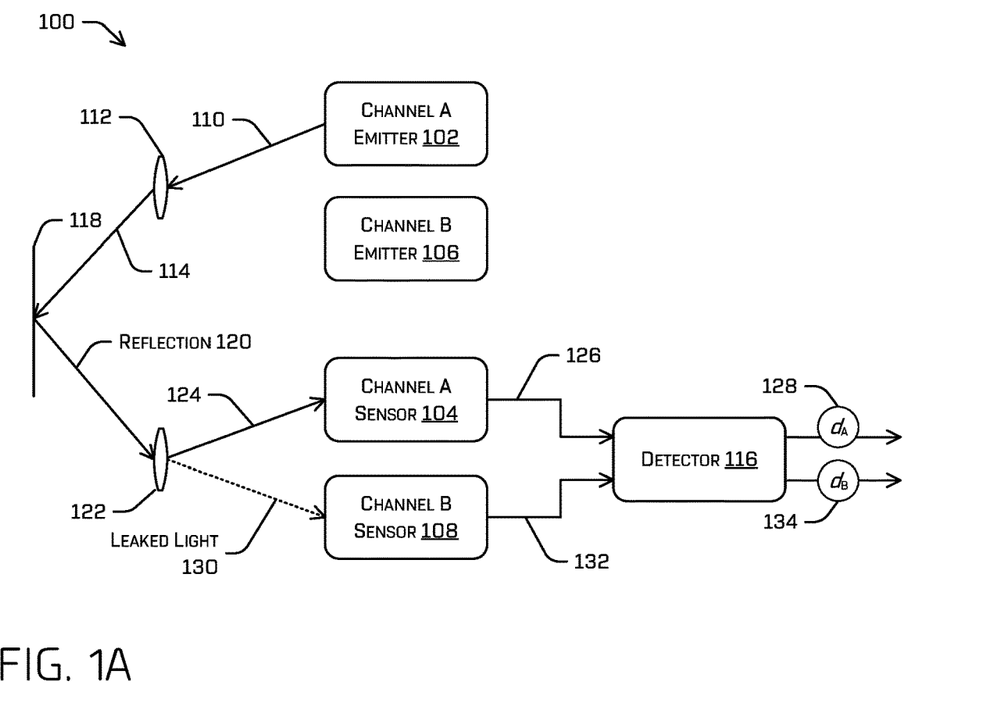
FIG. 1A illustrates a block diagram of components of an example LIDAR system that may comprise multiple channels and suppress false detections.
Figure 1B:
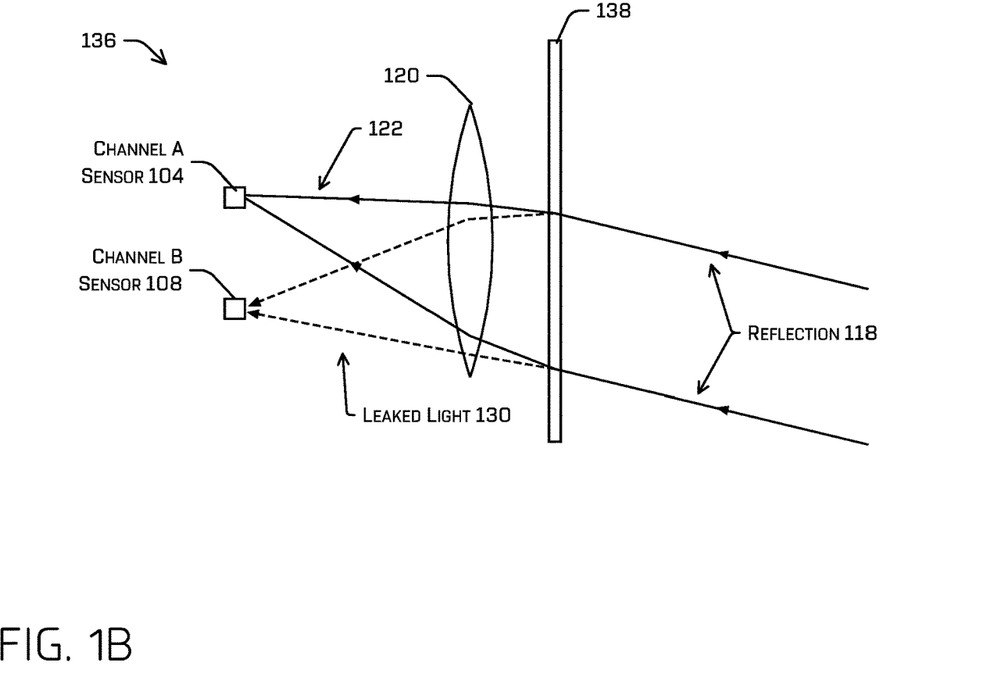
FIG. 1B illustrates a ray diagram of an example refraction of a strong reflection through a portion of a LIDAR device where the reflection causes light leakage into an adjacent channel, which may result in a false return by the sensor of the adjacent channel and/or a corresponding false detection corresponding to that adjacent channel.

FIG. 1A illustrates a block diagram of components of an example LIDAR system 100 that may comprise multiple channels and suppress false detections. The depicted example illustrates a scenario in which light attributable to a first channel ("channel A") leaks into a second channel ("channel B") (optical leakage), which, without implementing the techniques discussed herein, may result in a false detection (i.e., a false positive indication of the existence and/or position of a surface in an environment surrounding the example LIDAR system 100) if the channel B sensor 108 is active/being read. Although FIGS. 1A and 1B depict a two-channel LIDAR system, it is understood that, the example LIDAR system 100 may have any number of channels (e.g., 1, 2, 3, 4, 5, 10, 100).

A channel may be used to emit a laser light pulse and to measure properties of the reflections of the pulse, as explained below. In some examples, the example LIDAR system 100 may include a first channel that may include an emitter, channel A emitter 102, and a corresponding sensor, channel A sensor 104, and a second channel that may include channel B emitter 106 and/or channel B sensor 108. FIG. 1A depicts two measurement channels (e.g., light emitter/light sensor pair), although it is contemplated that the example LIDAR system 100 may include more or less channels. One skilled in the art would understand that the light emitters and light sensors may be multiplied in number beyond the single laser emitter and light sensor depicted. The term "channel" may also encompass supporting circuitry that is associated with the emitter/sensor pair and at least some of the supporting circuitry may be shared among multiple channels (e.g., detector(s), digital-to-analog converter (DAC), analog-to-digital converter (ADC)). In some examples, adjacent channels of example LIDAR system 100 may be disposed within a housing of the example LIDAR system 100 to emit light and/or receive light along different azimuths and/or altitudes. For example, channel A may measure a distance to any detectable surface in a first direction of an environment surrounding the example LIDAR system 100, whereas channel B may measure a distance to any detectable surface in a second direction, where the first direction and the second direction are separated by three to five degrees, for example.

In some examples, emitter 102 and/or 106 may include a laser emitter that produces light of a wavelength between 600 and 1000 nanometers. In additional or alternate examples, the wavelength of emitted light may range between 10 micrometers to 250 nm. The emitter 102 and/or 106 may emit light pulses (e.g., laser pulses) that vary in power and/or wavelength. For example, some of the laser emitters of the example LIDAR system 100 may emit light at a 905 nanometers, and others of the laser emitters may emit light at 1064 nanometers. The laser emitters of the different wavelengths can then be used alternately, so that the emitted light alternates between 905 nanometers and 1064 nanometers. The sensors 104 and/or 108 can be similarly configured to be sensitive to the respective wavelengths and to filter other wavelengths.

Activating or turning on an emitter may be referred to as "firing" the emitter. In some examples, the emitter 102 and/or 106 may be fired to create a light pulse having a short duration. Moreover, to conserve power, the example LIDAR system 100 may decrease the power of the emitted light pulse based, at least in part, on detected conditions of the environment into which the light pulse is to be emitted (e.g., low light/low noise conditions). In some examples, the emitter 102 and/or 106 may be driven to output a pseudo-random noise (PN) sequence and/or other code. For example, each emitter may output a difference PN sequence to differentiate between returns.

Note that, for the sake of clarity, although channel A and channel B may be activated substantially simultaneously (e.g., within technical tolerances) and/or the sensors 104 and 108 may be active at least for some overlapping time according to some LIDAR system designs the emission by channel B emitter 106 is not illustrated. Since the discussion herein regards identifying and/or removing false detections generated by leakage of light from one channel into another (e.g., leakage of light from channel A to channel B in this example), emissions of the channel B emitter 106 are not illustrated since a reflection of light emitted by the channel B emitter 106 and received by the channel B sensor 108 would constitute a true positive, whereas light received at the channel B sensor 108 that is attributable to a reflection of radiation emitted by the channel A emitter 102 may result in a false detection.

For a single distance measurement via channel A, the channel A emitter 102 may be controlled to emit a burst of light pulses 110 (i.e. one or more) through a lens 112 as emitted pulse 114 and the channel A sensor 104 may be powered on and/or otherwise allowed to pass a signal generated by the channel A sensor 104 to detector 116. In some examples, the detector 116 may read a signal generated by the channel A sensor 104 by opening a switch corresponding to the channel A sensor 104. A sensor is considered "active," according to the discussion herein, when the signal output by a sensor is being read by the detector 116 and/or otherwise being relied on to determine whether or not the output signal indicates the existence of a surface.

The emitted pulse 114 may be reflected by a surface 118 in an environment surrounding the example LIDAR system 100, as a reflection 120 (also referred to herein as reflected light) through the lens 122, and to the channel A sensor 104 along a return path 124. In some examples, the LIDAR may include multiple laser emitters positioned within a chassis to project laser light outward through the one or more lenses. In some examples, the LIDAR may also include multiple light sensors so that light from any particular emitter is reflected through the one or more lenses to a corresponding light sensor.

In some examples, the lens 112 and the lens 122 may be the same lens, depicted redundantly for clarity. In other examples, the lens 122 may be a second lens designed so that beams from emitters 102 and/or 106 at different physical positions within a housing of the LIDAR are directed outwardly at different angles. Specifically, the lens 112 may be designed to direct light from the emitter of a particular channel (e.g., channel A emitter 102) in a corresponding and unique direction. The lens 122 may be designed so that the corresponding sensor (e.g., channel A sensor 104) of the channel receives reflected light from the same unique direction to disambiguate between light received through the lens 122 that is attributable to reflections of light emitted by other emitter(s) (e.g., channel B emitter 106) along different direction(s).

In some examples, the sensors 104 and/or 108 may comprise a photomultiplier (e.g., silicon photomultiplier (SiPM)), photodiode (e.g., avalanche photodiode (APD), single-photon avalanche diode (SPAD)), and/or other device that converts light intensity at the sensor to a corresponding electrical signal (output signal 126). Assuming that the emitted pulse 114 is reflected from the surface 118 of an object, a portion of the output signal 126 generated by the channel A sensor 104 may be attributable to the reflection 120. This portion of the output signal 126 may be termed a "return" and/or "return signal." The return signal may generally be of the same shape as the light pulse 110 emitted by the channel A emitter 102, although it may differ to some extent as a result of noise, interference, cross-talk between different emitter/sensor pairs, interfering signals from other LIDAR devices, and so forth. The return signal will also be delayed with respect to the light pulse 110 by an amount corresponding to the round-trip propagation time of the emitted laser burst (i.e., the time delay of arrival).

In some examples, the detector 116 may read the output signal(s) generated by the sensor(s) of any currently active channels to determine whether any of the output signal(s) include a return signal. For example, the detector 116 may determine whether an amplitude, energy, trigger event count (e.g., every instance an avalanche is triggered at a SPAD), and/or any other indication of a reception of a reflection of light emitted by an emitter of a channel, satisfies a detection threshold (e.g., meets or exceeds a detection threshold in amps, in Joules, arbitrary number (e.g., a number of counts, or units, as output from an ADC), etc.). For example, if the channel A sensor 104 is active, the detector 116 may monitor the output signal 126 of the channel A sensor 104 to determine whether an amplitude of the output signal 126 meets or exceeds the detection threshold. If a portion of the output signal 126 meets or exceeds the detection threshold, the detector 116 may indicate that portion as being a return signal and/or may output a detection 128. For example, the detector 116 may determine a time delay of arrival between emission of the light pulse 110 and receiving the reflected light pulse at the channel A sensor 104 (i.e., as indicated by a relative time of the return signal) and/or a distance measurement corresponding to the time delay of arrival.

In some examples, the detector 116 may read a sensor by opening a switch corresponding to the sensor. A sensor is considered "active," according to the discussion herein, when the signal output by a sensor is being read by the detector 116 and/or otherwise being relied on to determine whether or not the output signal indicates the existence of a surface.

Highly reflective objects (e.g., retroreflector, street sign, or mirror) and/or objects that are spatially close to the LIDAR device, among other factors, may cause strong reflections of the light emitted by an emitter of the LIDAR device. Despite designing lens 122 to isolate reflections corresponding to different channels, if the reflection 120 is particularly strong, as may be the case when the emitted pulse 114 is reflected by a retroreflector, some of the reflection 120 may be received by an adjacent channel as "leaked light 130" (i.e., received by a sensor of a different channel, such as the channel B sensor 108 in an example where the reflection 120 corresponded to light emitted by the channel A emitter 102). Note that, as used herein, "strength" refers to an energy, illuminance, luminosity, intensity, and/or of the reflection, etc. and is a function of the reflectivity (L'Ambertian, specular, reflective, etc.) and/or scatter pattern of the surface 118.

If channel B is active when the leaked light 130 is received at the channel B sensor 108 (i.e., the channel B sensor 108 is turned on and the output signal 132 of the channel B sensor 108 is being read by the detector 116), the leaked light 130 will contribute to an output signal 132 of the channel B sensor 108. In instances where the reflection 120 is particularly strong, the detector 116 may identify the portion of the output signal 132 attributable to the leaked light 130 as a (false) return signal and/or output a detection 134 based at least in part on the return. For example, the portion of the output signal 132 attributable to the leaked light 130 may meet or exceed a detection threshold associated with the detector 116. Detection 134 is an example of a ghost detection.

The detector 116 may be implemented in part by a field-programmable gate array ("FPGA"), an application-specific integrated circuit (ASIC), a microcontroller, a microprocessor, a digital signal processor ("DSP"), and/or a combination of one or more of these and/or other control and processing elements, and may have associated memory for storing associated programs and data. In some examples, the techniques for identifying and/or removing ghost detections may be implemented by the detector 116, the sensors 104 and/or 108, and/or downstream components that are not depicted such as, for example, a device that receives output from the example LIDAR system 100 (e.g., a computing device of an autonomous vehicle and/or a component thereof such as, for example, a perception engine).

Example Ray Diagram

FIG. 1B illustrates an example ray diagram 136 of a portion of example LIDAR system 100 when a strong reflection (e.g., reflection 120) is received by the example LIDAR system 100 and the manner in which the leaked light 130 may be received by a sensor. The example ray diagram 136 includes a filter 138, lens 122, and a reflection 120 of light emitted by channel A that is presumed to be strong enough to cause light to leak to channel B. In some examples, filter 138 may remove radiation having wavelengths outside a wavelength of a spectrum of light detectable by the sensors and/or the filter 138 may serve to protect internal components of the example LIDAR system 100 from exterior elements (e.g., humidity, kinetic forces) while allowing light to be received by sensors 104 and/or 108.

In some instances, the leaked light 130 may be refracted by the lens 122 and/or filter 138 and/or reflected and/or refracted by any other component of the example LIDAR system 100 towards the channel B sensor 108. Although FIGS. 1A and 1B illustrate one example of a scenario in which a sensor may falsely detect an object due to the presence of a highly reflective object, it is understood that light may leak into another channel for any number of reasons. For example, light may reflect off of a photosensitive area of a first sensor and/or off components inside a housing of the LIDAR system 100 onto the photosensitive area of second sensor, light incident on the surface 118 may be refracted at multiple angles, one of which may include an angle such that light is received by a second sensor, etc.

Example Scenario

Figure 2:
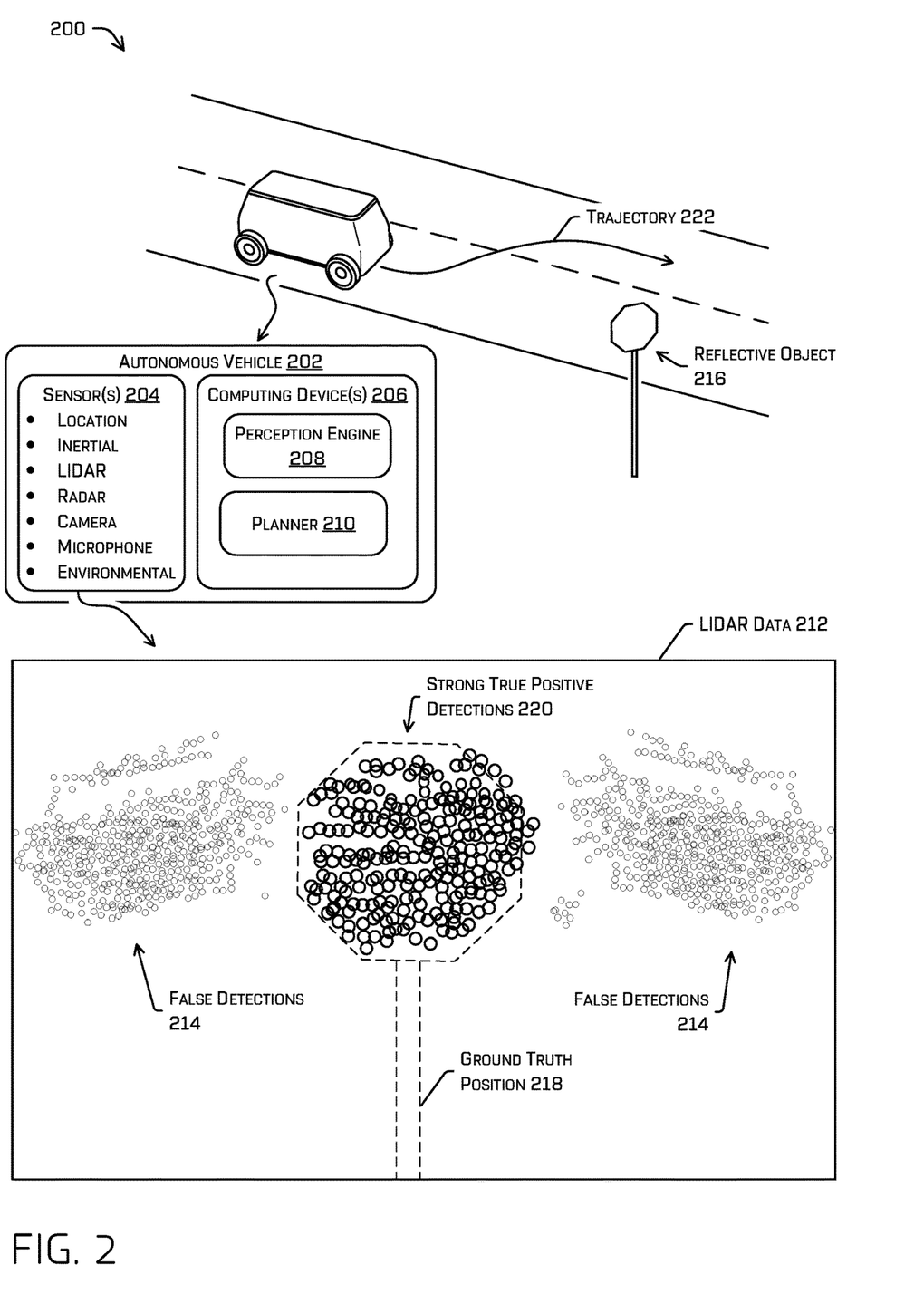
FIG. 2 illustrates an example scenario depicting an autonomous vehicle coming upon a highly reflective object and the potential effect caused by false detections.

FIG. 2 illustrates an example scenario 200 in which false detections may deleteriously affect the operation of a machine that relies on the accuracy of LIDAR detections, such as an autonomous vehicle 202. In some instances, the autonomous vehicle 202 may be an autonomous vehicle configured to operate according to a Level 5 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 202 may be a fully or partially autonomous vehicle having any other level or classification. Moreover, in some instances, the guidance isolation techniques described herein may be usable by non-autonomous vehicles as well. It is contemplated that the techniques discussed herein may apply to more than robotic control, such as for autonomous vehicles. For example, the techniques discussed herein may be applied to mapping, manufacturing, augmented reality, etc.

According to the techniques discussed herein, the autonomous vehicle 202 may receive sensor data from sensor(s) 204 of the autonomous vehicle 202. For example, the sensor data may include a location signal (e.g., a GPS signal), an inertia signal (e.g., an accelerometer signal, a gyroscope signal, etc.), a magnetometer signal, a wheel encoder signal, a speedometer signal, a point cloud of accumulated LIDAR and/or RADAR points, an image (or images), an audio signal, and/or bariatric or other environmental signals, etc.

In some examples, the autonomous vehicle may include computing device(s) 206 that may include a perception engine 208 and/or a planner 210. The perception engine 208 may include one or more machine-learned (ML) models and/or other computer-executable instructions for detecting, identifying, segmenting, classifying, and/or tracking objects based at least in part on sensor data collected from the environment of the autonomous vehicle 202. In some instances, the perception engine 208 may receive sensor data from sensor(s) 204 of the autonomous vehicle 202, determine perception data from the sensor data, and transmit the perception data to a planner 210 for use by the planner 210 to localize a position of the autonomous vehicle 202 on a global map and/or a local map, determine one or more trajectories, and/or control motion of the autonomous vehicle 202 to traverse a path or route, though any such operation may be performed in various other components (e.g., localization may be performed by a localization engine, not shown). In some instances, the perception data may be based at least in part on LIDAR data received from a LIDAR device of the sensor(s) 204. The planner 210 may determine instructions for controlling operations of the autonomous vehicle 202 based at least in part on perception data that is based on LIDAR data received from the LIDAR device.

In particular, the planner 210 may rely on one or more LIDAR device(s) of the sensor(s) 204 to determine the existence and/or position(s) of object(s) in order to safely and efficiently control operation of the autonomous vehicle 202. False positive detections of the existence of a surface by a LIDAR device may degrade operation of a machine that relies on LIDAR data, like autonomous vehicle 202. For example, FIG. 2 illustrates an example two-dimensional representation of LIDAR data 212 that comprises false detections 214 that may be generated by a LIDAR device of autonomous vehicle 202 as the autonomous vehicle 202 approaches a highly reflective object 216.

In some examples, a LIDAR detection may comprise an indication of a distance to a detected surface calculated based at least in part on a time of delay of arrival of a reflection of light emitted by an emitted of the LIDAR device, as discussed above. In some examples, a processor of the LIDAR device and/or the perception engine 208 may determine a position of the surface relative to an axis of the LIDAR device and/or the autonomous vehicle 202 based at least in part on a known orientation of the LIDAR device and/or the channel (e.g., altitude and/or azimuth.).

The representation of LIDAR data 212 depicted in FIG. 2 represents the ground truth 218 two-dimensional position of the reflective object 216 as a dashed line. The circles each represent a detection output by a LIDAR device and the size of the circle represents an intensity associated with the detection. Note that the depicted intensity of the points that correspond with the ground truth 218 (i.e., the strong true positive detections 220 in FIG. 2) are larger, as these detections would be associated with a greater signal intensity, and the circles representing the false detections 214 to the left and right of the strong true positive detections 220 are smaller.

Since the false detections 214 falsely identify a surface existing where none does, the planner 210 may alter a trajectory 222 of the autonomous vehicle to avoid colliding with the false surface and/or may take other undesirable actions, such as stopping forward progress, transmitting a request for teleoperations assistance, etc.

Example Output Signals

Figure 3:
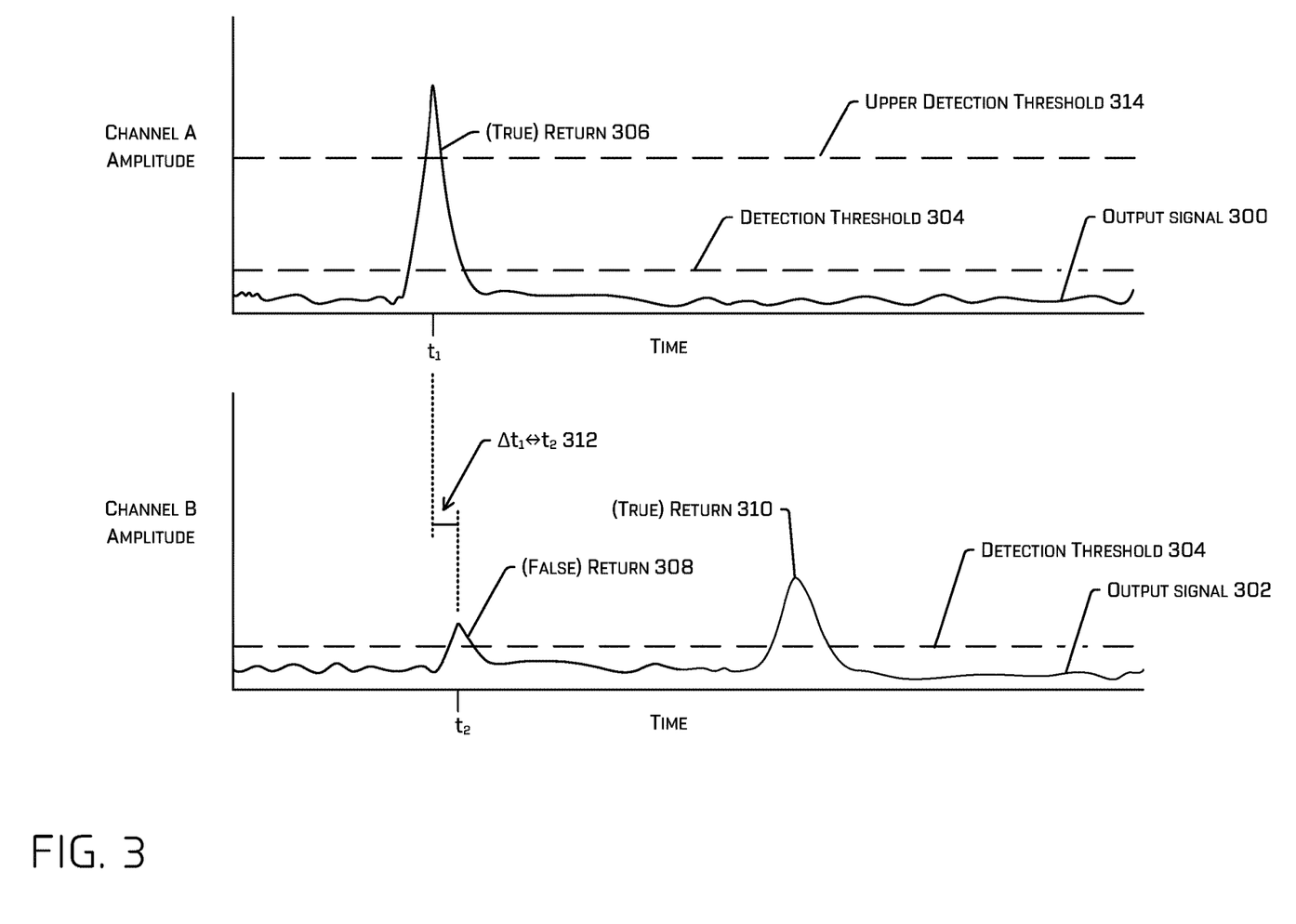
FIG. 3 illustrates signal diagrams of example output signals of two channels where a first channel includes a true return and a second channel includes a false return and a true return.
Figure 4A:
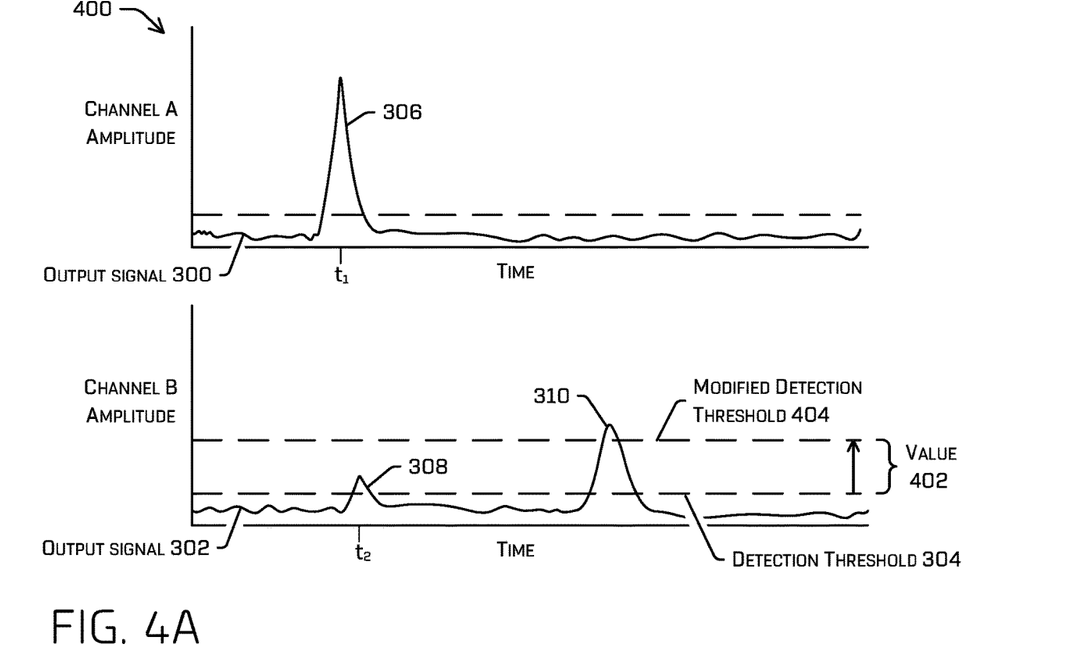
FIGS. 4A-4c illustrate signal diagrams of example output signals and/or techniques for suppressing a false detection.
Figure 4B:
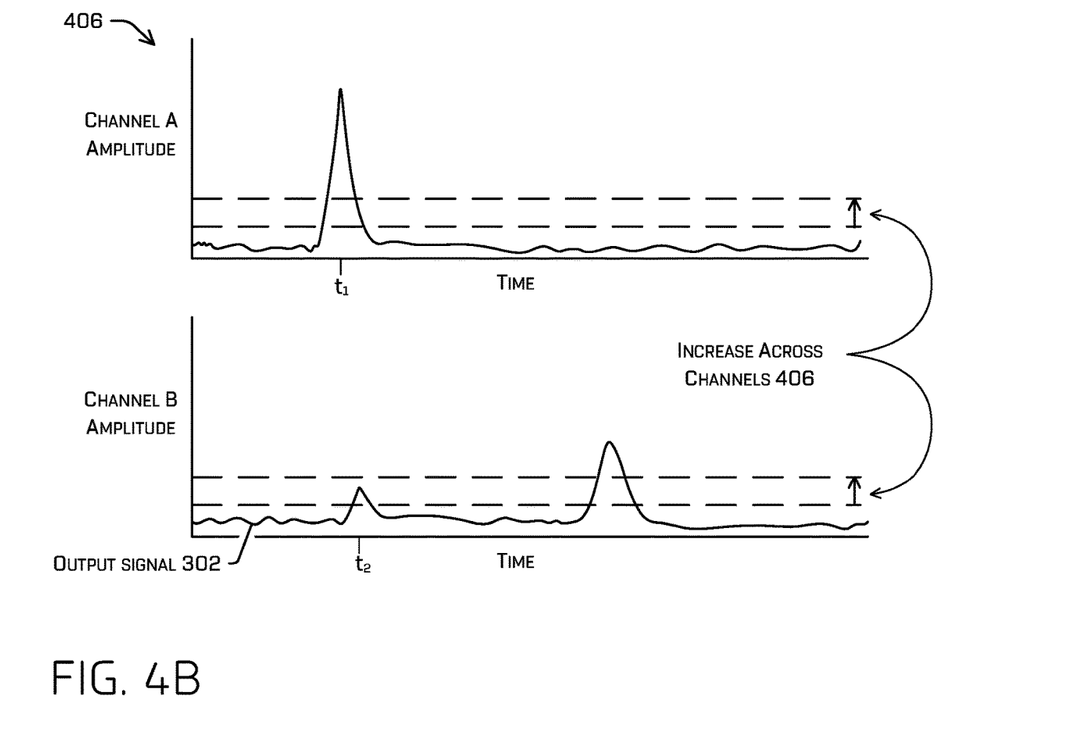
Figure 4C:
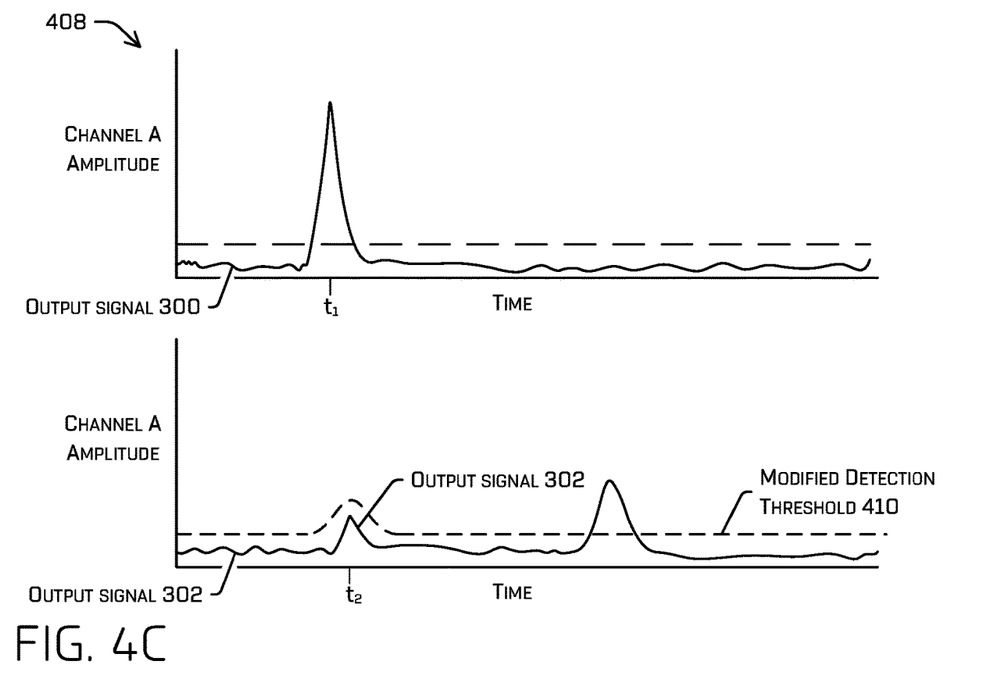

FIGS. 3-4C illustrate example signal diagrams of output signals received from two channels (channel A and channel B), which may represent the channels discussed in FIG. 1, for example. The example signal diagrams depict an amplitude of each output signal on a y-axis over time, displayed on the x-axis. Although the signal diagrams depict a magnitude of the output signals as an amplitude, it is contemplated that the output of a sensor of a channel may depend on the type of sensor used. For example, if the LIDAR system utilizes a sensor that comprises a SPAD, the output of the SPAD (and/or its associated circuitry) may actually be a pulse output and/or count (since the SPAD operates in Geiger mode), whereas other APDs may output a voltage that reflects the intensity of light incident on the sensor (as in the case of SiPMs and/or more traditional APDs). Regardless of the particular type(s) of sensors used, for the sake of simplicity FIGS. 3-4C and the corresponding description discuss the intensity of a signal as an amplitude, although it is understood that intensity may be measured in a variety of ways, depending on the sensor type and/or use (e.g., counts per nanosecond, voltage, current, power). Similarly, since the output signal may vary in from depending on the type of sensor used, the detection threshold discussed herein may have units that correspond with the sensor type used. For example, the detection threshold may be an indication of voltage, current, power, count rate, any combination thereof, etc.

Moreover, in some examples, although the depicted output signals have an appearance that looks like an analog signal, it is understood that intermediate electronics between the sensor and the detector may (or may not) comprise a DAC. In other words, the output signal may be sampled, amplified, and/or discretized in a manner that is not reflected in the figures and is not of consequence for this discussion, other than to note that the output signals may be digital signals and the detector may comprise a processor of some kind and/or, inversely, that the output signals may be analog signals and the detector may comprise an analog circuit.

The example signal diagrams illustrated in FIGS. 3-4C may represent the output signal generated by a sensor of a channel for the duration of time for which that sensor was active/being read by a detector. In some examples, this duration of time may be 1 microsecond, although it is understood that the duration may depend on the effective range of the LIDAR and/or the desired range of measurement. The depicted output signals are examples of signals that were generated contemporaneously.

FIG. 3 illustrates examples of an output signal 300 generated by a sensor of channel A (e.g., channel A sensor 104) and an output signal 302 substantially contemporaneously (within technical tolerances) generated by a sensor of channel B (e.g., channel B sensor 108). Channel A sensor 104 may generate output signal 300 based at least in part on being active and receiving reflection 120 and channel B sensor 108 may generate output signal 300 based at least in part on being active and receiving leaked light 130 associated with reflection 120 and subsequently receiving a reflection of light emitted by the channel B emitter 106.

FIG. 3 also illustrates a detection threshold 304 that is the same for channel A and for channel B in the depicted example, although in additional or alternate examples, the detection threshold 304 may be a different value for different channels, as discussed further herein. In some examples, the detection threshold 304 may be a variable stored and/or controlled by detector 116 and/or a downstream device such as, for example, a perception engine. The detection threshold 304 may preliminarily be set to avoid identifying noise as a detection.

In some examples, detector 116 may identify a portion of an output signal that meets or exceeds the detection threshold 304 as a return. As regards output signal 300 and output signal 302, the detector 116 may identify the portion of output signal 300 that exceeds the detection threshold 304 as a return 306, which, according to the example scenario discussed herein, is a true positive return. Additionally, the detector 116 may identify the portions of output signal 302 that exceed the detection 304 as returns, return 308 and return 310 respectively. However, since return 308 is attributable to the leaked light 130 instead of a reflection of light emitted from the channel B emitter 106, return 308 is a false return. Output of a distance measurement associated with return 308 would be a false detection. On the other hand, for the sake of example, return 310 may be attributable to a reflection of light emitted by the channel B emitter 106 and is therefore a true return.

To identify false returns and to prevent output of a false detection, the detector 116 may screen returns for those channels that are active at the same time and/or that are adjacent to each other and/or otherwise positioned to cause cross-channel (which may be optical) leakage. In some examples, screening the returns may comprise determining whether a first return of a first channel was received within a threshold time a second return of a second channel. Since time delay of arrival is proportional to distance, the detector 116 may make this determination based at least in part on a threshold time (for an analog signal), a threshold number of sample (for a digital signal), and/or a threshold distance. For example, FIG. 3 depicts return 308 as being received within $\Delta t_1 \leftrightarrow t_2$ (312) of return 306. This difference in time also corresponds to a distance by the following relation:

$$t = \frac{cd}{2}$$

where t is time in seconds, d is distance to the target in meters, and c is the speed of light.

Put simply, detector 116 may determine if a difference between the time (or corresponding distance) indicated by return 306 and return 308 meets or exceeds a threshold distance (e.g., 1 centimeter, 5 centimeters, 10 centimeters). If the difference in distance meets or exceeds the threshold, the detector 116 may go on to comparing the next pair of returns (if there are more) and/or generate detections for any returns that haven't been screened out. For example, the difference in distance indicated by return 306 and return 310 would exceed the threshold distance and therefore neither return would be screened out. This may be due, for example, to the high likelihood that the returns are not due to optical leakage or otherwise a coupling between the two channels.

However, if the detector 116 determines that a difference in distance between two returns does not meet the threshold, the detector 116 may conduct further screening operations. For example, detector 116 may determine that return 308 indicates a distance that is within the threshold distance of return 306. Since objects may have more and less reflective portions (e.g., a wall may have a mirror mounted on it, a retroreflective sign may be bolted to a wall, a person may wear a vest with retroreflective portions), it the detector 116 may not accurately distinguish return 308 as being a false return in every instance just because the return indicates a distance that is the same or very close to the distance indicated by return 306 that corresponds to the strong reflection 120. In the example of the retroreflective sign bolted to a wall, the returns may validly have the same distance return, as well as have differing returns for one channel returning from the wall and other from the retroreflective sign.

In some examples, the detector 116 may additionally or alternatively determine whether a difference (and/or a ratio) between a first intensity of a first return and a second intensity of a second return meets or exceeds a threshold difference. For example, the detector 116 may determine a difference in amplitude between return 306 and return 308. In some examples, the threshold difference may be a percentage and/or a static value. In at least some examples, the difference between the amplitudes may comprise subtraction of one from the other, a ratio of one to the other, relative differences of the amplitudes to one or more additional thresholds and/or functions thereof (e.g., total area under the pulses), or otherwise. If the difference meets or exceeds the threshold distance, the detector 116 may indicate that the return associated with the lesser amplitude is a false return. This works because a return attributable to reflection 120 from a highly reflective object indicates this reflectance with a very intense output signal, whereas the leaked light tends to produce a comparatively weak signal. On the other hand, if the difference in intensity between the two returns does not meet the threshold difference, the detector 116 may treat the returns as true returns.

For example, the difference in amplitude of return 306 and return 308 may meet or exceed the threshold difference and the detector 116 would therefore identify return 308, the return associated with the lower amplitude, is a false return.

The detector 116 may thereby be configured to detect returns that indicate a same or similar distance and/or a wide disparity in the intensity of those returns. To further ensure that a return is attributable to strong reflection that has caused leaked light, the detector 116 may additionally or alternatively determine whether one of the pair of returns being compared has an intensity that meets or exceeds an upper detection threshold 314, the value of which may be set to indicate that a return is likely a reflection from a highly reflective object (e.g., the return indicates that the light incident on the sensor is 90%, 95%, 99%, etc. or more of the energy of the emitted pulse 114). In some examples, the upper detection threshold 314 may additionally or alternatively be associated with, or otherwise indicative of, a saturated pulse. For example, a saturated pulse may comprise a "flat top" and the threshold may comprise a threshold number of samples that equal a maximum value output by an ADC (e.g., 2 or more sequential samples that equal a maximum value of an ADC may indicate that the return is a saturated signal—the dynamic range of the ADC is maximized by the output signal received at the ADC).

In sum, the detector 116 may identify a first return as being a false return based at least in part on determining that the first return indicates a first distance that is within a threshold distance of a second distance indicated by a second return in another channel and that a difference (and/or ratio) of intensity between the first return and the second return meets or exceeds a threshold difference. In some examples, such threshold differences may be determined dynamically (e.g., based on previous valid return), as a function of distance (time), and the like.

In a LIDAR system that includes three or more adjacent channels that are active simultaneously, the detector 116 may identify a first return (and channel) having the greatest intensity and compare other returns of the other channels thereto, identifying as false return(s) any of the other returns that indicate a distance within the threshold distance of the first return and a have an intensity that is less than the greatest intensity by an amount (or having a ration, relative difference, etc.) that meets or exceeds the threshold difference.

Based at least in part on identifying a return as a false return, the detector 116 may suppress and/or otherwise prevent a detection corresponding to the false return (ghost detection) from being output. FIGS. 4A-4C depict example techniques for suppressing a ghost detection. These techniques may be implemented by sensors 104 and/or 108, detector 116, and/or a downstream device. Any of the techniques discussed herein may be combined or implemented singularly.

FIG. 4A depicts an example technique 400 that comprises increasing the value of the detection threshold 304 by a value 402 to a modified detection threshold 404 for at least the channel in which the false return was detected. FIG. 4B depicts an example technique 406 that comprises increasing the value of the detection threshold 304 by a value 402 to a modified detection threshold 404 for both (and/or all) channels. FIG. 4C depicts an example technique 408 that comprises increasing the value of the detection threshold 304 for a region of the output signal corresponding to the false return, to obtain a modified detection threshold 410.

In some examples, the detection threshold 304 may be modified for the instance (i.e., sensor reading) that the channel(s) were active when the false return was received, for n number of instances where the channel(s) are active following the instance when the false return was received (where n is an integer greater than 0), and/or permanently. In additional or alternate examples, the detector 116 may increment an unmodified value of the detection threshold 304 based at least in part on repeatedly modifying the detection threshold. For example, the detector 116 may increment the starting detection threshold for each instance in which the channel previously detected a false return.

In some examples, the detector 116 may increase the value by of the detection threshold by a static value, a value that is based at least in part on the recurrence of returns in one or more channels, and/or a value that is based at least in part on characteristic(s) of an output signal of one or more channels. For example, the static value may be a value stored in memory and a value that is based on the recurrence of false returns in one or more channels may increase as a rate of false returns increase and/or decrease as a rate of false returns decreases.

A value that is based at least in part on characteristic(s) of an output signal of one or more channels may comprise, for example, an amplitude of the false return, the difference between an amplitude of the false return and an amplitude of the detection threshold 304, an amplitude of return 306, a percentage of a maximum amplitude of the channel (e.g., 70% of the amplitude of return 310), a moving average of a channel that contains a true return that is associated with the false return (e.g., a moving average of channel A), etc. For example, modified detection threshold 410 may comprise a modified moving average of the amplitude of channel A.

The detector 116 may generate a detection for any returns that meet or exceed the modified detection threshold 404 and/or 410. In the depicted example, since intensities of return 306 and return 310 exceed the modified detection threshold 404 and/or 410 in any of FIGS. 4A-4C, the detector 116 may generate a detection corresponding to return 306 and a detection corresponding to return 310.

In an additional or alternate example, emitters of the LIDAR system may output light according to different PN sequences so that light received at one or more sensors may corresponding to a particular emitter based on the PN sequence received. In such an example, light associated with a PN sequence of a different channel may be filtered from the output signal of a sensor that received the light.

Example Process

Figure 5:
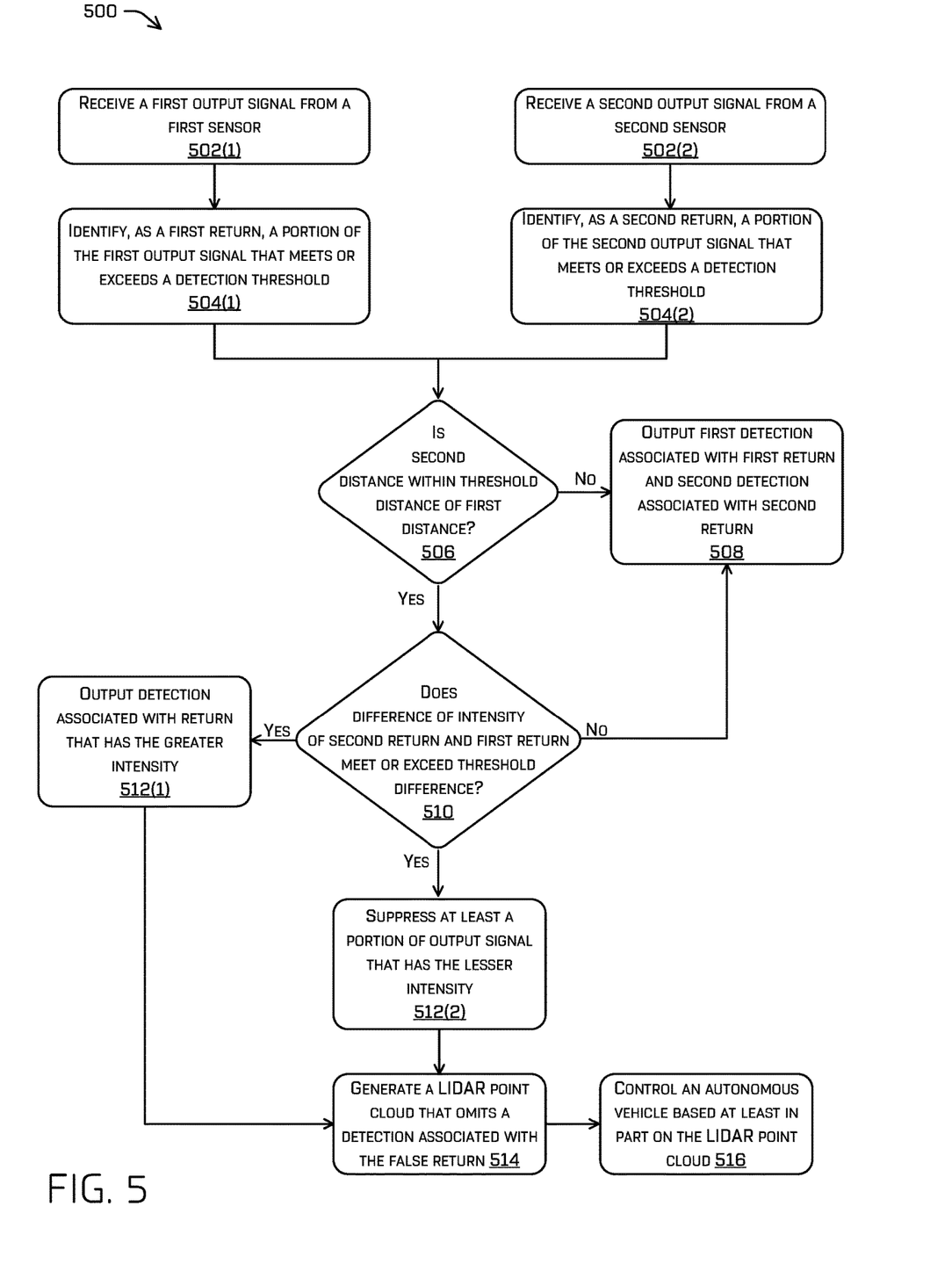
FIG. 5 illustrates a flow diagram of an example process for identifying a false return and/or suppressing a false detection.

FIG. 5 illustrates an example process 500 for identifying a false return and/or suppressing a false detection. In some examples, example process 500 may be accomplished by component(s) of example LIDAR system 100 such as, for example, sensors 104 and/or 108, detector 116, component(s) associated therewith, and/or a downstream device such as computing device(s) 206 and/or perception engine 208.

At operation 502(1) and/or 502(2), example process 500 may comprise receiving a first output signal from a first sensor (502(1)) and/or receiving second output signal from a second sensor (502(2)), according to any of the techniques discussed herein. It is contemplated that output signals may be received from as many channels as are active. For the sake of simplicity we discuss two channels, although more channels may or less channels may be active at a same and/or overlapping time. Subsequent discussions that may be replicated per channel are only discussed in regard to one channel for simplicity.

At operation 504(1) and/or 504(2), example process 500 may comprise identifying as a return associated with a first distance, a portion of the output signal that meets or exceeds a detection threshold, according to any of the techniques discussed herein. For example, operation 504 may comprise determining a time associated with a maximum value of the portion, a leading edge, a falling edge, and/or a mid-point of the portion. This time may be used to calculate a distance according to time delay of arrival.

At operation 506, example process 500 may comprise determining whether the second return is within a threshold distance of the first distance, according to any of the techniques discussed herein. For example, operation 506 may comprise determining whether a first distance (associated with the first return) is within a threshold distance of a second distance (associated with the second return) and/or whether a first time associated with the first return is within a threshold time lapsed of a second time associated with the second return.

If the second distance is outside the threshold distance of the first distance, example process 500 may continue to operation 508 (i.e., a difference between the first distance and the second distance meets or exceeds the threshold distance). However, if the second distance is within the threshold distance of the first distance, example process 500 may continue to operation 510 (i.e., a difference between the first distance and the second distance is less than the threshold distance).

At operation 508, example process 500 may comprise outputting a first detection associated with the first return and a second detection associated with the second return, according to any of the techniques discussed herein. For example, operation 508 may comprise outputting a depth measurement in association with the channel that generated the return, based at least in part on a time delay of arrival of the return (and/or intensities, uncertainties, etc.). A downstream device and/or component, such as the perception engine 208 and/or a processor of the LIDAR may utilize this information to generate a three-dimensional position in association with the depth measurement.

At operation 510, example process 500 may comprise determining whether a difference of intensity, a ratio of intensities, and the like between a first intensity of the first return and a second intensity of the second return meets or exceeds a threshold difference, according to any of the techniques discussed herein. For example, the threshold difference may comprise absolute value of amplitude, energy, count rate, etc. In an additional or alternate example, the threshold difference may comprise a ratio and/or percentage (e.g., 5%, 10%, 15%). In such an example, operation 510 may inversely comprise determining whether the lesser intensity of the two intensities is a percentage of the greater intensity that is less than the threshold difference.

If the difference meets or exceeds the threshold difference (for an example where the threshold difference is some indication of magnitude) and/or if the difference is less than the threshold difference (for an example where the threshold difference is some indication of percentage), the example process 500 may continue to operations 512(1) and 512(2). Otherwise, the example process 500 may continue to operation 508.

At operation 512(1), example process 500 may comprise outputting a detection associated with whichever of the returns has a greater intensity, of the two, (and/or whichever return has not been identified as being a false positive), according to any of the techniques discussed herein.

At operation 512(2), example process 500 may comprise identifying the return that has the lesser intensity as being a false return and/or suppressing output of a detection of the false return (which may be associated with a portion of the output signal received from the sensor), according to any of the techniques discussed herein. In some examples, suppressing the output of the detection may comprise increasing the detection threshold for at least the channel associated with the false return, according to any of the techniques discussed herein. In at least some examples, the process 500 may additionally or alternatively output a confidence associated with the false return. In at least some examples, such a confidence may be based on, for example, the difference, ratio, etc. calculated, a distance between the two sensors on a physical device, a percentage of overlap in time the two sensors were active, and/or some combination thereof. As a non-limiting example, a small ratio of intensities coupled with a large maximum intensity and close proximity of the sensors may be indicative of a high confidence/certainty of a false detection.

At operation 514, example process 500 may comprise generating a LIDAR point cloud based at least in part on the detections generated by the detector, according to any of the techniques discussed herein. The detector discussed herein is configured to modify the detection threshold and therefore restrict output of a detection associated with a false return, therefore the LIDAR point cloud generated using the detections output by the detector may omit a detection attributable to a false return. The LIDAR point cloud accuracy is thereby increased. The LIDAR point cloud may be generated may be based at least in part on depth measurement, azimuth, and/or altitude associated with a detection. In some examples, a perception engine of the autonomous vehicle may generate the LIDAR point cloud.

At operation 516, example process 500 may comprise controlling an autonomous vehicle based at least in part on the LIDAR point cloud, according to any of the techniques discussed herein. For example, a planner of the autonomous vehicle may generate a trajectory for controlling operation of the autonomous vehicle based at least in part on LIDAR point cloud.

Example System Architecture

Figure 6:
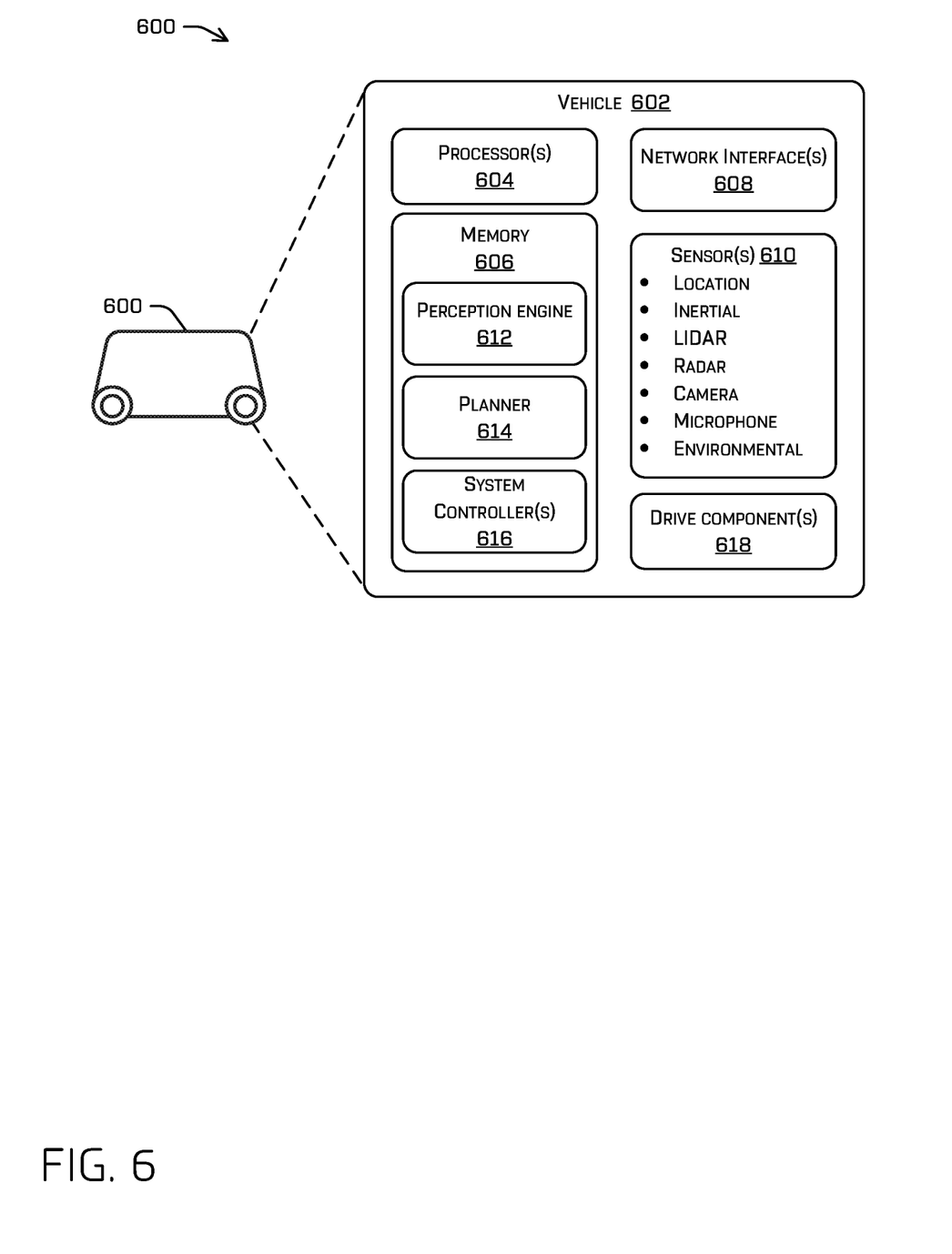
FIG. 6 illustrates a block diagram of an example system for identifying a false return and/or suppressing a false detection from LIDAR sensor output.

FIG. 6 is a block diagram of an example architecture 600 including an example vehicle system 602 for controlling operation of at least one vehicle, such as an autonomous vehicle, using distances determined by a LIDAR system, according to any of the techniques discussed herein.

In some examples, the vehicle system 602 may include processor(s) 604 and/or memory 606. These elements are illustrated in combination in FIG. 6, although it is understood that they may be separate elements of the vehicle system 602, and that components of the system may be implemented as hardware and/or software, in some examples.

Processor(s) 604 may include a uniprocessor system including one processor, or a multiprocessor system including several processors (e.g., two, four, eight, or another suitable number). The processor(s) 604 may be any suitable processor capable of executing instructions. For example, in various implementations, the processor(s) 604 may be general-purpose or embedded processors implementing any of a variety of instruction set architectures (ISAs), such as the x86, PowerPC, SPARC, or MIPS ISAs, or any other suitable ISA. In multiprocessor systems, each processor 804 may commonly, but not necessarily, implement the same ISA. In some examples, the processor(s) 604 may include a central processing unit (CPU), a graphics processing unit (GPU), FPGA, Application Specific Integrated Circuit (ASIC), or a combination thereof. In some examples, the classifier and/or one or more of the detectors discussed herein may be implemented using any of these processor architectures. For example, the classifier and/or the one or more detectors may be FPGAs.

The example vehicle system 602 may include memory 606. In some examples, the memory 606 may include a non-transitory computer readable media configured to store executable instructions/modules, data, and/or data items accessible by the processor(s) 604. In various implementations, the non-transitory computer readable media may be implemented using any suitable memory technology, such as static random access memory (SRAM), synchronous dynamic RAM (SDRAM), nonvolatile/Flash-type memory, or any other type of memory. In the illustrated example, program instructions and data implementing desired operations, such as those described above, are shown stored within the non-transitory computer readable memory. In other implementations, program instructions, and/or data may be received, sent, or stored on different types of computer-accessible media, such as non-transitory computer readable media, or on similar media separate from the non-transitory computer readable media. Generally speaking, a non-transitory, computer readable memory may include storage media or memory media, such as flash memory (e.g., solid state memory), magnetic or optical media (e.g., a disk) coupled to the example vehicle system 602. Program instructions and data stored via a non-transitory computer readable medium may be transmitted by transmission media or signals such as electrical, electromagnetic, or digital signals, which may be conveyed via a communication medium such as a network and/or a wireless link, such as may be implemented via network interface(s) 608.

The example LIDAR system 100 may comprise a processor such as processor(s) 604 and/or memory such as memory 606.

Furthermore, though illustrated as a single unit in FIG. 6, it is understood that the processor(s) 604 and memory 606 may be distributed among multiple computing devices of the vehicle and/or among multiple vehicles, data centers, teleoperation centers, etc. In some examples, the processor(s) 604 and memory 606 may conduct at least some of the techniques discussed herein and the processor(s) 604 and memory 606 may include processor(s) and memory of the LIDAR system discussed herein.

The example vehicle system 602 may include network interface(s) 608 configured to establish a communication link (i.e., "network") between the vehicle system 602 and one or more other devices. In various implementations, the network interface(s) 608 may support communication via wireless general data networks, such as a Wi-Fi network, and/or telecommunications networks, such as, for example, cellular communication networks, satellite networks, and the like. In some examples, the sensor data discussed herein, such as a received signal, TDOA, depth measurement, output signal(s), return(s), and/or detection(s), etc., may be received at a first vehicle and transmitted to a second computing device. In some examples, at least some of the components of the LIDAR may be located at different devices. For example, a first vehicle may include the light emitter and light sensor and may generate the received signal, but may transmit the received signal to a second vehicle and/or remote computing device.

The example vehicle system 602 may include sensor(s) 610, for example, configured to localize the vehicle system 602 in an environment, to detect one or more objects in the environment, to sense movement of the example vehicle system 602 through its environment, sense environmental data (e.g., ambient temperature, pressure, and humidity), and/or sense conditions of an interior of the example vehicle system 602 (e.g., passenger count, interior temperature, noise level). The sensor(s) 610 may include, for example, one or more LIDAR sensors 818, which may represent the example system 100 and/or components thereof; one or more cameras (e.g. RGB-cameras; intensity (grey scale) cameras; infrared cameras; depth cameras; stereo cameras); one or more magnetometers; one or more radar sensors; one or more sonar sensors; one or more microphones; one or more inertial sensors (e.g., accelerometers, gyroscopes); one or more GPS sensors; one or more Geiger counter sensors; one or more wheel encoders; one or more drive system sensors; a speed sensor; and/or other sensors related to the operation of the example vehicle system 602.

In some examples, the example vehicle system 602 may include a perception engine 612 and/or a planner 614.

The perception engine 612 may include instructions stored on memory 606 that, when executed by the processor(s) 604, configure the processor(s) 604 to receive sensor data from the sensor(s) 610 as input, which may include output signal(s), return(s), and/or detection(s) output by the LIDAR system discussed herein. In some examples, the perception engine 612 may include instructions stored on memory 606 that, when executed by the processor(s) 604, configure the processor(s) 604 to determine a cloud of LIDAR points based, at least in part, on estimated output signal(s), return(s), and/or detection(s) determined according to any of the techniques discussed herein. In some examples, the perception engine 612 may use the LIDAR point cloud to determine one or more of a representation of the environment surrounding the example vehicle system 602, the pose (e.g. position and orientation) of an object in the environment surrounding the example vehicle system 602, an object track associated with the object (e.g., a historic position, velocity, acceleration, and/or heading of the object over a period of time (e.g. 5 seconds)), and/or an object classification associated with the object (e.g. a pedestrian, a vehicle, a bicyclist, etc.). In some examples, perception engine 612 may be configured to predict more than an object trajectory of one or more objects. For example, the perception engine 612 may be configured to predict multiple object trajectories based on, for example, probabilistic determinations or multi-modal distributions of predicted positions, trajectories, and/or velocities associated with an object detected from the LIDAR point cloud.

In some examples, the planner 614 may receive the LIDAR point cloud and/or any other additional information (e.g., object classifications, object tracks, vehicle pose) and use this information to generate a trajectory for controlling motion of the vehicle 802. In some instances, the planner may transmit the trajectory to system controller(s) 616 to be converted into instructions and/or signals for operating drive component(s) 618.

In some instances, the vehicle system 602 may include one or more drive components 618. In some instances, the vehicle system 602 may have a single drive component 618. In some instances, the drive component(s) 618 may include one or more sensors to detect conditions of the drive component(s) 618 and/or the surroundings of the vehicle system 602. By way of example and not limitation, the sensor(s) of the drive component(s) 618 may include one or more wheel encoders (e.g., rotary encoders) to sense rotation of the wheels of the drive components, inertial sensors (e.g., inertial measurement units, accelerometers, gyroscopes, magnetometers, etc.) to measure orientation and acceleration of the drive component, cameras or other image sensors, ultrasonic sensors to acoustically detect objects in the surroundings of the drive component, LIDAR sensors, RADAR sensors, etc. Some sensors, such as the wheel encoders may be unique to the drive component(s) 618. In some cases, the sensor(s) on the drive component(s) 618 may overlap or supplement corresponding systems of the vehicle system 602 (e.g., sensor(s) 610).

The drive component(s) 618 may include many of the vehicle systems, including a high voltage battery, a motor to propel the vehicle, an inverter to convert direct current from the battery into alternating current for use by other vehicle systems, a steering system including a steering motor and steering rack (which may be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive component(s) 618 may include a drive component controller which may receive and preprocess data from the sensor(s) and to control operation of the various vehicle systems. In some instances, the drive component controller may include one or more processors and memory communicatively coupled with the one or more processors. The memory may store one or more components to perform various functionalities of the drive component(s) 618. Furthermore, the drive component(s) 618 may also include one or more communication connection(s) that enable communication by the respective drive component with one or more other local or remote computing device(s).

Example Clauses

A. A method comprising: receiving, from a first sensor associated with a first channel of a LIDAR device, a first output signal associated with a first distance; receiving, at a second sensor associated with a second channel of the LIDAR device, a second output signal associated with a second distance; identifying, as a first return, a first portion of the first output signal that meets or exceeds a detection threshold; identifying a second portion of the second output signal as comprising a false positive return based at least in part on: determining that the second distance is within a threshold distance of the first distance; and determining that a difference between a first intensity of the first output signal and a second intensity of the second output signal meets or exceeds a threshold difference; outputting, as a positive detection, a first distance measurement based at least in part on identifying the first return; and discarding a second distance measurement associated with the second output signal based at least in part on identifying the second portion of the second output signal as comprising a false positive return.

B. The method of paragraph A, wherein identifying the second portion of the second output signal as comprising a false positive return is further based at least in part on determining that at least one of: the first sensor is within a threshold physical distance of the second sensor; a portion of the first output signal and a portion of the second output signal were generated substantially simultaneously; or the first intensity of the first portion meets or exceeds an upper detection threshold, wherein the upper detection threshold is greater than the detection threshold.

C. The method of either paragraph A or B, wherein discarding the second distance measurement comprises at least one of: increasing the detection threshold of the second channel; increasing, based at least in part on at least one of the first intensity or the second intensity, the detection threshold of the second channel; or increasing the detection threshold of the first channel and the second channel.

D. The method of any one of paragraphs A-C, wherein the difference comprises a ratio, and further wherein the threshold difference comprises a percentage of the first return.

E. A system comprising: a first sensor associated with a first channel; a second sensor associated with a second channel; one or more processors; and a memory storing processor-executable instructions that, when executed by the one or more processors, cause the system to perform operations comprising: receiving, from the first sensor, a first return signal associated with a first distance; receiving, from the second sensor, a second return signal associated with a second distance; identifying at least a portion of the second return signal as comprising a false positive return based at least in part on: determining that the second distance is within a threshold distance of the first distance; and determining that a difference between a first intensity of the first return signal and a second intensity of the second return signal meets or exceeds a threshold difference.

F. The system of paragraph E, the operations further comprising modifying a detection threshold, to obtain a modified detection threshold, associated with at least the second channel based at least in part on the identifying, and wherein modifying the detection threshold comprises at least one of: increasing the detection threshold for the second channel; increasing the detection threshold for the second channel based on the second distance; increasing, based at least in part on at least one of the first intensity or the second intensity, the detection threshold of the second channel; or increasing the detection threshold in of the first channel and the second channel.

G. The system of either paragraph E or F, wherein the difference comprises a ratio of a portion of the first return signal to a portion of the second return signal.

H. The system of any one of paragraphs E-G, wherein the operations further comprise: outputting a confidence associated with the false positive return, the confidence based at least in part on one or more of: a distance between the first sensor and the second sensor; a ratio of a portion of the first return signal to a portion of the second return signal, or a ration of first time that the first sensor was active to a second time that the second sensor was active.

I. The system of any one of paragraphs E-H, wherein identifying at least the portion of the second return signal as comprising a false positive return is further based at least in part on determining that at least one of: the first sensor is within a threshold physical distance of second sensor; a portion of the first return signal was generated substantially simultaneously with a portion of the second return signal; or the first intensity meets or exceeds an upper detection threshold, wherein the upper detection threshold is greater than the detection threshold.

J. The system of any one of paragraphs E-I further comprising: a first emitter associated with the first channel, the first emitter configured to emit a first light pulse based at least in part on activation of the first channel; and a second emitter associated with the second channel, the second emitter configured to emit a second light pulse based at least in part on activation of the second channel.

K. The system of any one of paragraphs E-J, wherein modifying the detection threshold comprises modifying the detection threshold within a range of times.

L. The system of any one of paragraphs E-K, wherein the operations further comprise: determining that at least a first portion of the first return signal meets or exceeds the modified detection threshold; outputting, as a positive detection, a first distance measurement associated with the first portion based at least in part on determining that the first portion meets or exceeds the modified detection threshold; determining that the portion of the second return signal is less than the modified detection threshold; and refraining from outputting a second distance measurement associated with the portion of the second return signal.

M. A non-transitory computer-readable medium storing processor-executable instructions that, when executed by one or more processors, cause the one or more processors to perform operations comprising: receiving, from a first sensor, a first return signal associated with a first distance; receiving, from a second sensor, a second return signal associated with a second distance; and identifying at least a portion of the second return signal as comprising a false positive return based at least in part on: determining that the second distance is within a threshold distance of the first distance; and determining that a difference between a first intensity of the first return signal and a second intensity of the second return signal meets or exceeds a threshold difference.

N. The non-transitory computer-readable medium of paragraph M, wherein the operations further comprise: modifying a detection threshold, to obtain a modified detection threshold, based at least in part on the identifying the at least a portion of the second return signal as comprising a false positive return.

O. The non-transitory computer-readable medium of paragraph N, wherein modifying the detection threshold comprises: increasing the detection threshold for a second channel associated with the second sensor; increasing, based at least in part on at least one of the first intensity or the second intensity, the detection threshold for the second channel; or increasing the detection threshold for a first channel associated with the first sensor and the second channel.

P. The non-transitory computer-readable medium of either paragraph N or O, wherein the operations further comprise: determining that at least a first portion of the first return signal meets or exceeds the modified detection threshold; outputting, as a positive detection, a first distance measurement associated with the first portion based at least in part on determining that the first portion meets or exceeds the modified detection threshold; determining that the portion of the second return signal is less than the modified detection threshold; and refraining from outputting a second output associated with second return signal.

Q. The non-transitory computer-readable medium of any one of paragraphs M-P, wherein difference comprises one or more of: a ratio of the first intensity to the second intensity, a ratio of the second intensity to the first intensity, a subtraction of the first intensity from the second intensity, or a subtraction of the second intensity from the first intensity.

R. The non-transitory computer-readable medium of any one of paragraphs M-Q, wherein identifying at least the portion of the second return signal as comprising a false positive return is further based at least in part on determining that at least one of: the first sensor is within a threshold physical distance of the second sensor; the first channel and the second channel were active during a same period of time; or the first intensity meets or exceeds an upper detection threshold, wherein the upper detection threshold is greater than the detection threshold.

S. The non-transitory computer-readable medium of any one of paragraphs M-R, wherein the operations further comprise: emitting a first light pulse via a first emitter associated with a first channel associated with the first sensor; emitting a second light pulse via a second emitter associated with a second channel associated with the second sensor; and wherein: the first return signal is generated by the first sensor based at least in part on receiving a reflection of at least the first light pulse, and the second return signal is generated by the second sensor based at least in part on receiving a portion of the reflection of the first light pulse.

T. The non-transitory computer-readable medium of any one of paragraphs M-S, wherein modifying the detection threshold comprises modifying the detection threshold for a period of time based at least in part on one or more of the first intensity or the second intensity.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously (within technical tolerances), in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

What is claimed is:

1. A method comprising:
   receiving, from a first sensor associated with a first channel of a LIDAR device, a first output signal associated with a first distance;
   receiving, at a second sensor associated with a second channel of the LIDAR device, a second output signal associated with a second distance;
   identifying, as a first return, a first portion of the first output signal that meets or exceeds a detection threshold;
   identifying a second portion of the second output signal as comprising a false positive return based at least in part on:
      determining that the second distance is within a threshold distance of the first distance; and
      determining that a difference between a first intensity of the first output signal and a second intensity of the second output signal meets or exceeds a threshold difference;
   outputting, as a positive detection, a first distance measurement based at least in part on identifying the first return; and
   discarding a second distance measurement associated with the second output signal based at least in part on identifying the second portion of the second output signal as comprising a false positive return.

2. The method of claim 1, wherein identifying the second portion of the second output signal as comprising a false positive return is further based at least in part on determining that at least one of:
   the first sensor is within a threshold physical distance of the second sensor;
   a portion of the first output signal and a portion of the second output signal were generated substantially simultaneously; or
   the first intensity of the first portion meets or exceeds an upper detection threshold, wherein the upper detection threshold is greater than the detection threshold.

3. The method of claim 1, wherein discarding the second distance measurement is based at least in part on at least one of:
   increasing the detection threshold of the second channel;
   increasing, based at least in part on at least one of the first intensity or the second intensity, the detection threshold of the second channel; or
   increasing the detection threshold of the first channel and the second channel.

4. The method of claim 1, wherein the difference comprises a ratio, and
   further wherein the threshold difference comprises a percentage of the first return.

5. A system comprising:
   a first sensor associated with a first channel;
   a second sensor associated with a second channel;
   one or more processors configured to perform operations comprising:
      receiving, from the first sensor, a first return signal associated with a first distance;
      receiving, from the second sensor, a second return signal associated with a second distance;
      identifying at least a portion of the second return signal as comprising a false positive return based at least in part on:
         determining that the second distance is within a threshold distance of the first distance; and
         determining that a difference between a first intensity of the first return signal and a second intensity of the second return signal meets or exceeds a threshold difference.

6. The system of claim 5, the operations further comprising modifying a detection threshold, to obtain a modified detection threshold, associated with at least the second channel based at least in part on the identifying, and
   wherein modifying the detection threshold comprises at least one of:
      increasing the detection threshold for the second channel;
      increasing the detection threshold for the second channel based on the second distance;
      increasing, based at least in part on at least one of the first intensity or the second intensity, the detection threshold of the second channel; or
      increasing the detection threshold in of the first channel and the second channel.

7. The system of claim 5, wherein the difference comprises a ratio of a portion of the first return signal to a portion of the second return signal.

8. The system of claim 5, wherein the operations further comprise:
   outputting a confidence associated with the false positive return, the confidence based at least in part on one or more of:
      a distance between of the first sensor and the second sensor;
      a ratio of a portion of the first return signal to a portion of the second return signal, or
      a ration of first time that the first sensor was active to a second time that the second sensor was active.

9. The system of claim 5, wherein identifying at least the portion of the second return signal as comprising a false positive return is further based at least in part on determining that at least one of:
   the first sensor is within a threshold physical distance of second sensor;

a portion of the first return signal was generated substantially simultaneously with a portion of the second return signal; or the first intensity meets or exceeds an upper detection threshold, wherein the upper detection threshold is greater than the detection threshold.

10. The system of claim 5 further comprising:
a first emitter associated with the first channel, the first emitter configured to emit a first light pulse based at least in part on activation of the first channel; and
a second emitter associated with the second channel, the second emitter configured to emit a second light pulse based at least in part on activation of the second channel.

11. The system of claim 6, wherein modifying the detection threshold comprises modifying the detection threshold within a range of times.

12. The system of claim 6, wherein the operations further comprise:
determining that at least a first portion of the first return signal meets or exceeds the modified detection threshold;
outputting, as a positive detection, a first distance measurement associated with the first portion based at least in part on determining that the first portion meets or exceeds the modified detection threshold;
determining that the portion of the second return signal is less than the modified detection threshold; and
refraining from outputting a second distance measurement associated with the portion of the second return signal.

13. A non-transitory computer-readable medium storing processor-executable instructions that, when executed by one or more processors, cause the one or more processors to perform operations comprising:
receiving, from a first sensor, a first return signal associated with a first distance;
receiving, from a second sensor, a second return signal associated with a second distance; and
identifying at least a portion of the second return signal as comprising a false positive return based at least in part on:
determining that the second distance is within a threshold distance of the first distance; and
determining that a difference between a first intensity of the first return signal and a second intensity of the second return signal meets or exceeds a threshold difference.

14. The non-transitory computer-readable medium of claim 13, wherein the operations further comprise:
modifying a detection threshold, to obtain a modified detection threshold, based at least in part on the identifying the at least a portion of the second return signal as comprising a false positive return.

15. The non-transitory computer-readable medium of claim 14, wherein modifying the detection threshold comprises:
increasing the detection threshold for a second channel associated with the second sensor;
increasing, based at least in part on at least one of the first intensity or the second intensity, the detection threshold for the second channel; or
increasing the detection threshold for a first channel associated with the first sensor and the second channel.

16. The non-transitory computer-readable medium of claim 14, wherein the operations further comprise:
determining that at least a first portion of the first return signal meets or exceeds the modified detection threshold;
outputting, as a positive detection, a first distance measurement associated with the first portion based at least in part on determining that the first portion meets or exceeds the modified detection threshold;
determining that the portion of the second return signal is less than the modified detection threshold; and
refraining from outputting a second output associated with second return signal.

17. The non-transitory computer-readable medium of claim 13, wherein difference comprises one or more of:
a ratio of the first intensity to the second intensity,
a ratio of the second intensity to the first intensity,
a subtraction of the first intensity from the second intensity, or
a subtraction of the second intensity from the first intensity.

18. The non-transitory computer-readable medium of claim 13, wherein identifying at least the portion of the second return signal as comprising a false positive return is further based at least in part on determining that at least one of:
the first sensor is within a threshold physical distance of the second sensor;
the first channel and the second channel were active during a same period of time; or
the first intensity meets or exceeds an upper detection threshold, wherein the upper detection threshold is greater than the detection threshold.

19. The non-transitory computer-readable medium of claim 13, wherein the operations further comprise:
emitting a first light pulse via a first emitter associated with a first channel associated with the first sensor;
emitting a second light pulse via a second emitter associated with a second channel associated with the second sensor; and
wherein:
the first return signal is generated by the first sensor based at least in part on receiving a reflection of at least the first light pulse, and
the second return signal is generated by the second sensor based at least in part on receiving a portion of the reflection of the first light pulse.

20. The non-transitory computer-readable medium of claim 14, wherein modifying the detection threshold comprises modifying the detection threshold for a period of time based at least in part on one or more of the first intensity or the second intensity.

* * * * *